A. CONSTANTIN.
PROTECTING COVER FOR PNEUMATIC TIRES.
APPLICATION FILED JUNE 28, 1909.
957,413.
Patented May 10, 1910.
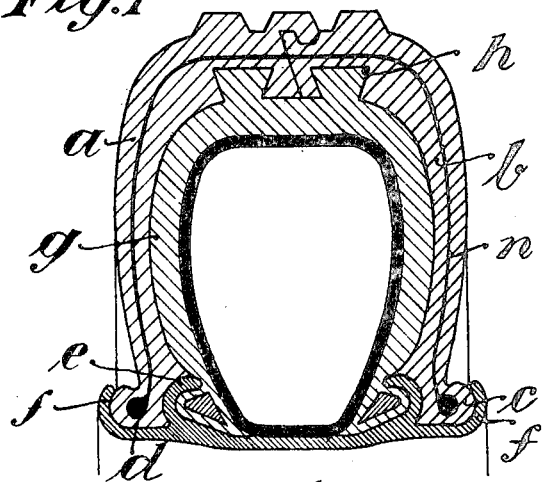
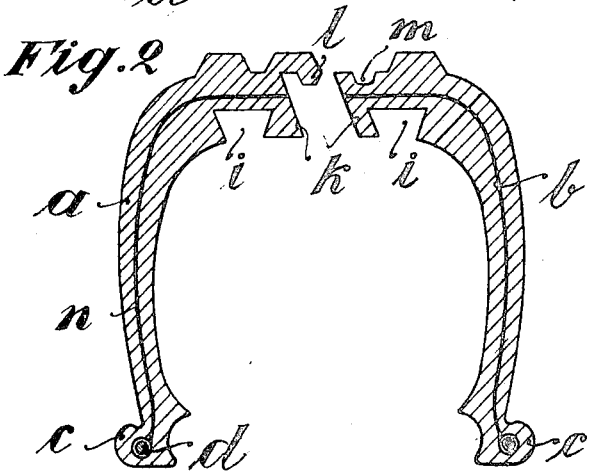
Witnesses
Inventor

UNITED STATES PATENT OFFICE.

ANGELY CONSTANTIN, OF HANOVER, GERMANY.

PROTECTING-COVER FOR PNEUMATIC TIRES.

957,413.  Specification of Letters Patent.  Patented May 10, 1910.

Application filed June 28, 1909. Serial No. 504,815.

*To all whom it may concern:*

Be it known that I, ANGELY CONSTANTIN, a subject of the King of Prussia, German Emperor, and resident of Hanover, Germany, have invented certain new and useful Improvements in Protecting-Covers for Pneumatic Tires, of which the following is a specification.

This invention relates to protecting covers for pneumatic tires and more particularly to such tires which are destined to be used with the wheels of motor cars.

The protecting covers for pneumatic tires of known construction are rather difficult to put on the tire and it is further difficult to secure the same in position.

According to this invention the construction of such protecting covers is improved in such a manner that they are easily put on and that they are well secured in their position upon the wheel rim.

In the accompanying drawings the improved protecting cover is shown in Figure 1 in vertical section and in connection with a pneumatic tire. Fig. 2 represents in vertical section the protecting cover without the tire, the two parts thereof separated.

The improved protecting cover is composed of two parts $a$, $b$ which are ring shaped and have a thickened inner edge $c$ which is retained by means of wires $d$ inserted in said edges, which are inserted into the curved flanges of the auxiliary rim $f$ which is arranged at the side of the ordinary rim $e$. The rim $e$ carries in the well known manner the pneumatic tire $g$ which may be of any suitable known construction and which has upon its outer surface two or more circular ribs $h$ of dovetailed cross section which are destined to engage with correspondingly shaped grooves $i$ provided in the inner surface of the protecting cover $a$, $b$. The outer edges of the ring shaped parts $a$, $b$ are beveled at $k$ so that they fit well the one against the other when the parts $a$, $b$ are put upon the wheel rim. The outer edge of the one part, $a$ for example, has further a circular flap $l$ of curved cross section which is destined to engage with a correspondingly shaped groove $m$ of the other part.

The tread of the protecting cover may be of any suitable shape and construction and may have any additional means for strengthening the same.

The parts $a$, $b$ of the protecting cover have insertions $n$ of wire gauze which greatly increase the resistance of the cover against puncture.

I claim:—

An improved protecting cover for pneumatic tires comprising two ring-shaped parts of india-rubber which together form the protecting cover and both of which have circular grooves in the inner surface, beveled outer edges, thickened inner edges and an insertion of wire gauze, one of the parts having a circular groove in the outer surface near the outer edge and a flap of circular cross section extending from the outer edge of one of said parts and destined to engage with the circular groove of the other part, in combination with a pneumatic tire having circular ribs upon its outer surface destined to engage with the circular grooves of the inner surface of the parts of the protecting cover and an auxiliary felly at the side of the ordinary felly which carries the pneumatic tire, said auxiliary felly being destined to carry the protecting cover, substantially as described.

In witness whereof I have hereunto set my hand in the presence of two witnesses.

ANGELY CONSTANTIN.

Witnesses:
  JULIUS JACOBSBERG,
  ERNST VOGELER.